US010877252B2

(12) United States Patent
Chen et al.

(10) Patent No.: US 10,877,252 B2
(45) Date of Patent: Dec. 29, 2020

(54) FIXED-FOCUS PROJECTION LENS

(71) Applicant: Coretronic Corporation, Hsin-Chu (TW)

(72) Inventors: Yi-Chin Chen, Hsin-Chu (TW); Tao-Hung Kuo, Hsin-Chu (TW); Wen-Chieh Chung, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 66 days.

(21) Appl. No.: 16/254,610

(22) Filed: Jan. 23, 2019

(65) Prior Publication Data

US 2019/0302428 A1    Oct. 3, 2019

(30) Foreign Application Priority Data

Apr. 2, 2018    (CN) .......................... 2018 1 0282471

(51) Int. Cl.
*G02B 13/18*    (2006.01)
*G02B 13/16*    (2006.01)
(Continued)

(52) U.S. Cl.
CPC ............. *G02B 13/16* (2013.01); *G02B 1/041* (2013.01); *G02B 5/005* (2013.01); *G02B 9/64* (2013.01);
(Continued)

(58) Field of Classification Search
CPC ........ G02B 13/16; G02B 13/18; G02B 1/041; G02B 9/64; G02B 5/005; G02B 13/0045; G02B 13/006
See application file for complete search history.

(56) References Cited

U.S. PATENT DOCUMENTS

2015/0036228 A1*  2/2015  Nagahara ............... G02B 13/04
                                                             359/708
2017/0052354 A1   2/2017  Kim et al.
2017/0184823 A1*  6/2017  Jiang ..................... G02B 13/18

FOREIGN PATENT DOCUMENTS

CN          102466874           5/2012
CN          104950426           9/2015
(Continued)

OTHER PUBLICATIONS

"Office Action of Taiwan Counterpart Application," dated Jan. 19, 2019, p. 1-p. 6.

*Primary Examiner* — Alicia M Harrington
(74) *Attorney, Agent, or Firm* — JCIPRNET (57) ABSTRACT

A fixed-focus projection lens including a first lens group, an aperture stop and a second lens group arranged sequentially along an optical axis of the fixed-focus projection lens in a direction from an outgoing side to an incoming side. The first lens group includes a first lens element to the sixth lens element arranged sequentially along the optical axis in a direction from the outgoing side to the incoming side. The second lens group includes a seventh lens element to an eleventh lens element arranged sequentially along the optical axis in a direction from the outgoing side to the incoming side. The material of the first lens element is plastic. The material of the second lens element to the eleventh lens element is glass. The fixed-focus projection lens of the disclosure has a smaller size, good optical quality and good durability of high temperature.

14 Claims, 8 Drawing Sheets

(51) Int. Cl.
*G02B 13/00* (2006.01)
*G02B 1/04* (2006.01)
*G02B 9/64* (2006.01)
*G02B 5/00* (2006.01)

(52) U.S. Cl.
CPC ....... *G02B 13/006* (2013.01); *G02B 13/0045* (2013.01)

(56) References Cited

FOREIGN PATENT DOCUMENTS

| | | |
|---|---|---|
| TW | I333560 | 11/2010 |
| TW | I427652 | 2/2014 |
| TW | I436149 | 5/2014 |
| TW | 201634970 | 10/2016 |

\* cited by examiner

FIXED-FOCUS PROJECTION LENS

CROSS-REFERENCE TO RELATED APPLICATION

This application claims the priority benefit of China application serial no. 201810282471.4, filed on Apr. 2, 2018. The entirety of the above-mentioned patent application is hereby incorporated by reference herein and made a part of this specification.

BACKGROUND OF THE DISCLOSURE

Field of the Disclosure

The disclosure is related to a projection lens, and particularly to a fixed-focus projection lens.

Description of Related Art

Projectors on the market have been developed in a trend to have a higher brightness and a lighter weight. Therefore, a favorable projection lens structure with advantageously light weight, small volume and/or low cost is an interest for manufacturers in the market. In consideration of the above, a light weight projections lens has been mostly designed as a fixed-focus projection lens.

In the structure of a current fixed-focus projection lens, a multiple-piece aspheric projection lens is generally used to meet the requirement of smaller volume and lighter weight. In the above projection lens, at least two plastic lenses with negative refractive power are included, which may cause thermal drift when used in a high-temperature environment. The quality of an image may therefore be compromised. As a result, it has been an interest for those ordinarily skilled in the art to design a projection lens available at high temperature, which is also favorable in volume and price.

The information disclosed in this BACKGROUND section is only for enhancement of understanding of the BACKGROUND section of the described technology and therefore it may contain information that does not form the prior art that is already known to a person of ordinary skill in the art. Further, the information disclosed in the BACKGROUND section does not mean that one or more problems to be resolved by one or more embodiments of the disclosure were acknowledged by a person of ordinary skill in the art.

SUMMARY OF THE DISCLOSURE

An embodiment of the disclosure provides a fixed-focus projection lens, which is relatively smaller in volume, preferred in optical performance and more durable at a wide range of temperatures.

The objectives and advantages of the disclosure may be further understood in the technical features disclosed in the disclosure.

To achieve one or a part of or all the objectives or other objectives, an embodiment of the disclosure provides a fixed-focus projection lens, which includes a first lens group, an aperture diaphragm and a second lens group arranged sequentially along an optical axis of the fixed-focus projection lens in a direction from an outgoing side to an incoming side. The first lens group has negative refractive power, and the first lens group includes a first lens element, a second lens element, a third lens element, a fourth lens element, a fifth lens element and a sixth lens element arranged sequentially along the optical axis in a direction from the outgoing side to the incoming side. The second lens group has positive refractive power, and the second lens group includes a seventh lens element, an eighth lens element, a ninth lens element, a tenth lens element and an eleventh lens element arranged sequentially along the optical axis in a direction from the outgoing side to the incoming side. The material of the first lens element is plastic, and the material of the second lens element to the eleventh lens element is glass.

Based on the above, the embodiments of the disclosure at least have one of the following advantages or effects. In fixed-focus projection lenses of the embodiments of the disclosure, with the overall configuration of various lens elements in the fixed-focus projection lens, the fixed-focus projection lens may have good optical performance with a smaller volume, and the thermal drift may be substantially prevented.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

DESCRIPTION OF EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
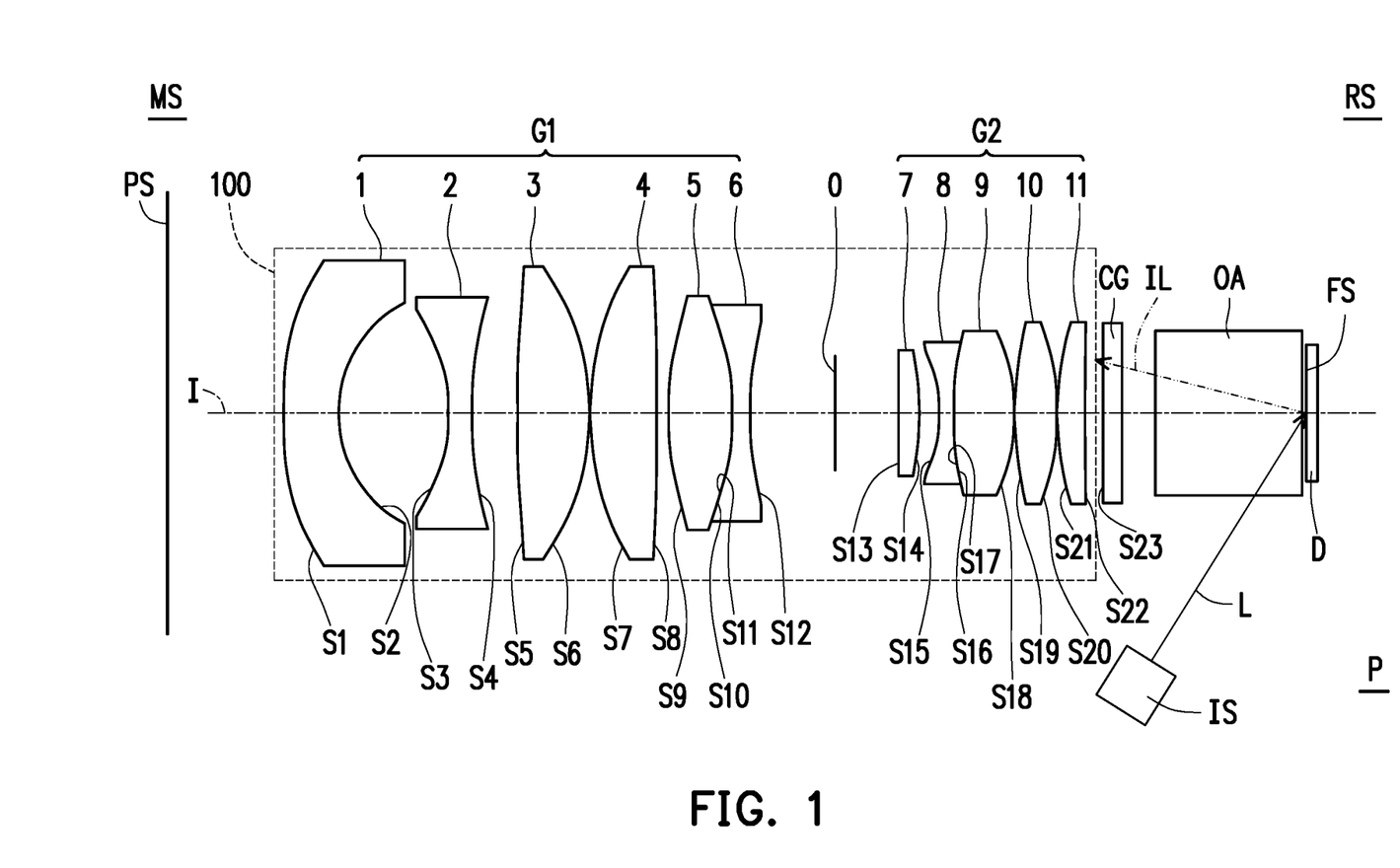
FIG. 1 is a schematic view of a fixed-focus projection lens according to an embodiment of the disclosure.

FIG. 1 is a schematic view of a fixed-focus projection lens according to an embodiment of the disclosure. Referring to FIG. 1, in the embodiment, a fixed-focus projection lens 100 is disposed between an outgoing side MS and an incoming side RS and has an optical axis I. The fixed-focus projection lens 100 includes a first lens group G1, an aperture diaphragm 0 and a second lens group G2 arranged sequentially along the optical axis I in a direction from the outgoing side MS to the incoming side RS, wherein the first lens group G1 consists of sixth lens elements, and the second lens group consists of five lens elements. These elements and the configuration relationship thereof will be described in details below.

The first lens group G1 is disposed between the outgoing side MS and the aperture diaphragm 0, and the first lens group G1 has a negative refractive power. Specifically, the first lens group G1 includes a first lens element 1, a second lens element 2, a third lens element 3, a fourth lens element 4, a fifth lens element 5 and a sixth lens element 6 arranged sequentially along the optical axis I in a direction from the outgoing side MS to the incoming side RS, and each of these lens elements has a refractive power. In the first lens group G1, the first lens element 1 has a negative refractive power, the second lens element 2 has a negative refractive power, the third lens element 3 has a positive refractive power, the fourth lens element 4 has a positive refractive power, the fifth lens element 5 has a positive refractive power, and the sixth lens element 6 has a negative refractive power. The first lens element 1 may be a convex-concave lens element which is convex toward the outgoing side MS. The second lens element 2 may be a biconcave lens element. The third lens element 3 may be a biconvex lens element. The fourth lens element 4 may be a biconvex lens element. The fifth lens element 5 may be a biconvex lens element. The sixth lens element 6 may be a biconcave lens element.

The second lens group G2 is disposed between the aperture diaphragm 0 and the incoming side RS, and the second lens group G2 has a positive refractive power. Specifically, the second lens group G2 includes a seventh lens element 7, an eighth lens element 8, a ninth lens element 9, a tenth lens element 10 and an eleventh lens element 11 arranged sequentially along the optical axis I in a direction from the outgoing side MS to the incoming side RS. In the second lens group G2, the seventh lens element 7 has a positive refractive power, the eighth lens element 8 has a negative refractive power, the ninth lens element 9 has a positive refractive power, the tenth lens element 10 has a positive refractive power, and the eleventh lens element 11 has a positive refractive power. The seventh lens element 7 may be a concave-convex lens element that is concave toward the outgoing side MS. The eighth lens element 8 may be a biconcave lens element. The ninth lens element 9 may be a biconvex lens element. The tenth lens element 10 may be a biconvex lens element. The eleventh lens element 11 may be a convex-concave lens element which is convex toward the outgoing side MS.

In the embodiment, from the outgoing side MS, the first lens element 1 comes first among all those lens elements with refractive power, and the material of the first lens element 1 is plastic. The material of the second lens element 2 to the eleventh lens element 11 is glass.

In the embodiment, the first lens group G1 and the second lens group G2 may each include at least one cemented lens and the aberration may therefore be effectively reduced. As shown in FIG. 1, in the first lens group G1, the fifth lens element 5 and the sixth lens element 6 form a cemented lens. In the second lens group G2, the eighth lens element 8 and the ninth lens element 9 form a cemented lens. The cemented lenses described above may be aspects of various cemented lenses combination, and the disclosure is not limited thereto.

Additionally, an embodiment of the fixed-focus projection lens 100 is provided below. It should be pointed out that the data provided in Table 1 and Table 2 below does not serve to limit the disclosure. With reference to the present invention, those ordinarily skilled in the art may make an amendment or modification as required based on the data and/or settings within the principles of the present invention, and such amendments or modifications may fall into the scope of the present invention. Additionally, the Fno/f-number of the fixed-focus projection lens 100 in the embodiment is 1.67, for example.

TABLE 1

| Component | Surface | Radius of curvature (mm) | Gap (mm) | Refractive index | Abbe number |
|---|---|---|---|---|---|
| First | S1 | 56.50 | 6.00 | 1.53 | 56 |
| lens element 1 | S2 | 14.95 | 12.05 | | |
| Second | S3 | −19.46 | 2.50 | 1.77 | 49.6 |
| lens element 2 | S4 | 44.14 | 4.92 | | |
| Third | S5 | 130.58 | 7.95 | 1.72 | 50.2 |
| lens element 3 | S6 | −27.30 | 0.10 | | |
| Fourth | S7 | 32.68 | 7.33 | 1.81 | 25.4 |
| lens element 4 | S8 | −173.11 | 1.36 | | |
| Fifth | S9 | 40.40 | 6.95 | 1.71 | 53.9 |
| lens element 5 | S10 | −28.39 | 0.00 | | |
| Sixth | S11 | −28.39 | 1.80 | 1.85 | 23.8 |
| lens element 6 | S12 | 33.29 | 9.33 | | |
| Aperture diaphragm 0 | | | 7.32 | | |
| Seventh | S13 | −125.52 | 2.09 | 1.77 | 49.6 |
| lens element 7 | S14 | −29.92 | 2.21 | | |
| Eighth | S15 | −16.13 | 1.50 | 1.85 | 23.8 |
| lens element 8 | S16 | 30.14 | 0.00 | | |
| Ninth | S17 | 30.14 | 6.71 | 1.50 | 81.5 |
| lens element 9 | S18 | −22.83 | 0.10 | | |
| Tenth | S19 | 40.50 | 4.54 | 1.50 | 81.5 |
| lens element 10 | S20 | −31.02 | 0.10 | | |
| Eleventh | S21 | 31.37 | 2.83 | 1.92 | 18.9 |
| lens element 11 | S22 | 143.05 | | | |

Referring to FIG. 1 and Table 1, Table 1 lists surfaces of each of the lens elements. For example, surface S1 is a surface of the first lens element 1 toward the outgoing side MS, surface S2 is a surface of the first lens element 1 toward the incoming side RS and other surfaces listed in table 1 may be identified as such. Additionally, the gap refers to a straight-line distance between two adjacent surfaces along the optical axis I. For example, the gap corresponding to surface S1 is the straight-line distance between surface S1 and surface S2 along the optical axis I, the gap corresponding to surface S2 is the straight-line distance between surface S2 and surface S3 along the optical axis I, and other gaps listed in table 1 may be defined as such.

Furthermore, in the embodiment, the first lens group G1 includes at least one aspheric lens. For example, in the first lens group G1, the first lens element 1 is an aspheric lens. The second lens element 2 to the eleventh lens element 11 are spherical lenses. In other words, both surface S1 and surface S2 of the first lens element 1 are aspheric surfaces. Surface S3 to surface S22 of these lens elements from the second lens element 2 to the eleventh lens element 11 are spherical surfaces. However, these aspheric and/or spherical surface combinations are described for the purpose of illustrating aspects of embodiments, and the disclosure is not limited thereto. An equation for the aspheric lens is shown below:

$$X = \frac{Y^2}{R(1 + \sqrt{1 - (1+k)*Y^2/R^2})} + A_2 Y^2 + A_4 Y^4 + A_6 Y^6 + A_8 Y^8 + A_{10} Y^{10} + A_{14} Y^{14}$$

Equation (1)

In equation (1), X represents sag in the direction of optical axis I, R represents radius of an osculating sphere (that is, radius of curvature at the optical axis I (such as the radius of curvature listed in Table 1). k represents conic coefficient, Y represents spherical height (that is, the height from the center to the edge of lens element, and coefficients $A_2$, $A_4$, $A_6$, $A_8$, $A_{10}$ and $A_{14}$ are aspheric coefficients. Aspheric parameters of surface S1 and surface S2 of the first lens element 1 are listed in Table 2 below. Except for the aspheric coefficients listed in the Table below, other aspheric coefficients are 0.

TABLE 2

| Surface | S1 | S2 |
|---|---|---|
| k | 0.00E+00 | 1.02E−02 |
| $A_4$ | 4.25E−05 | 5.02E−05 |
| $A_6$ | −1.47E−07 | −1.56E−07 |
| $A_8$ | 5.02E−10 | −1.65E−10 |
| $A_{10}$ | −1.07E−12 | 2.90E−12 |
| $A_{12}$ | 1.27E−15 | −1.41E−14 |

Figure 2:
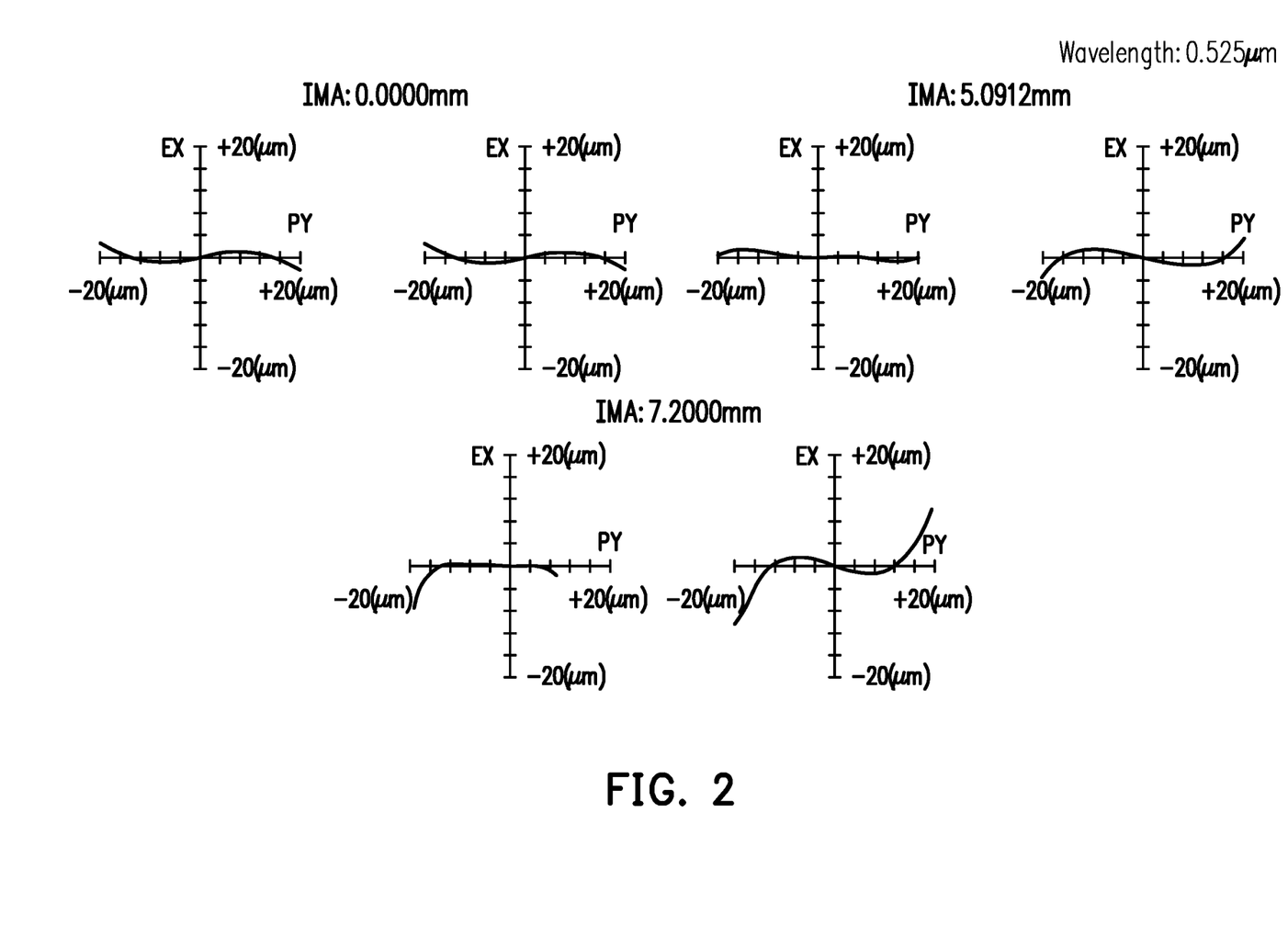
FIG. 2 is a transverse ray fan plot of the fixed-focus projection lens according to the embodiment of FIG. 1.
Figure 3:
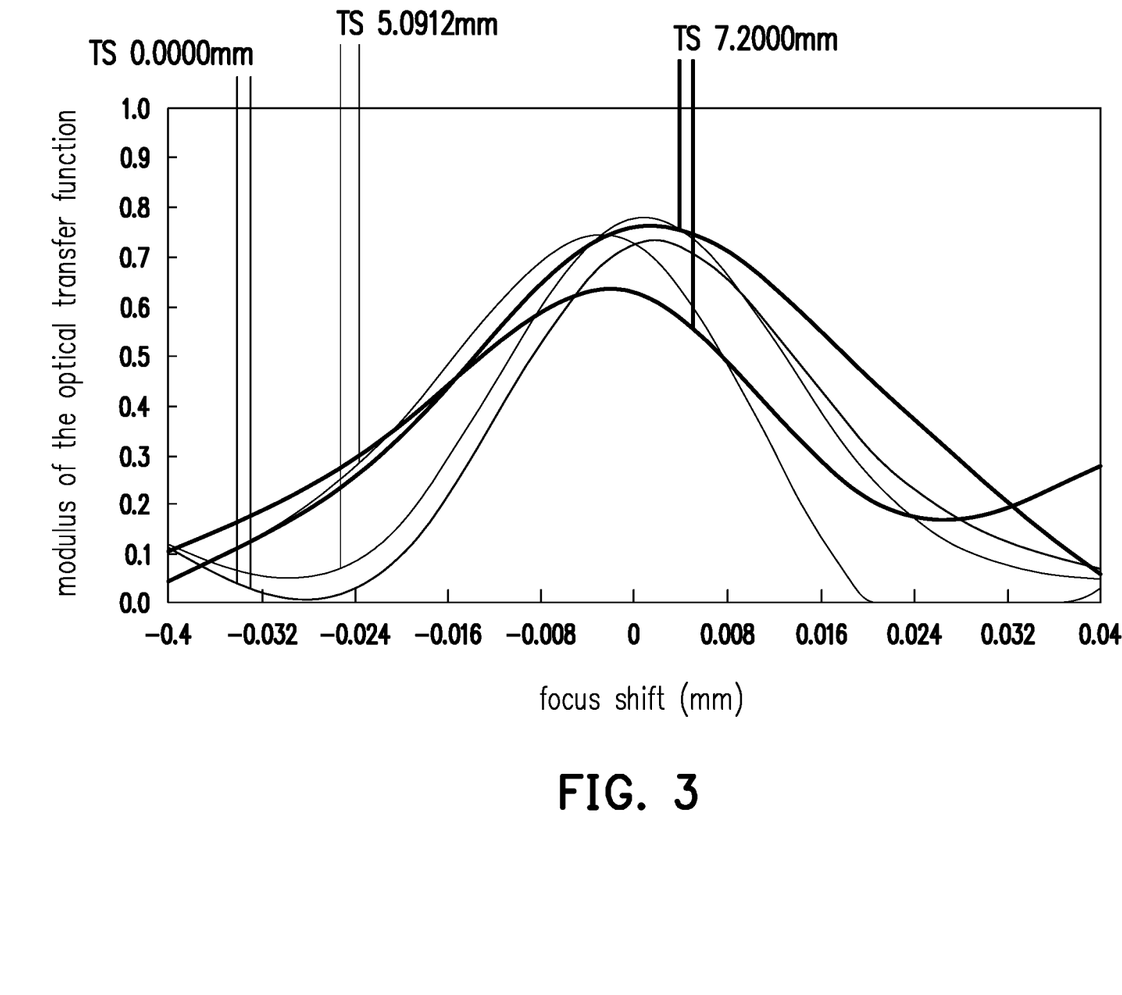
FIG. 3 is a modulation transfer function curve diagram of the fixed-focus projection lens according to the embodiment of FIG. 1.
Figure 4:
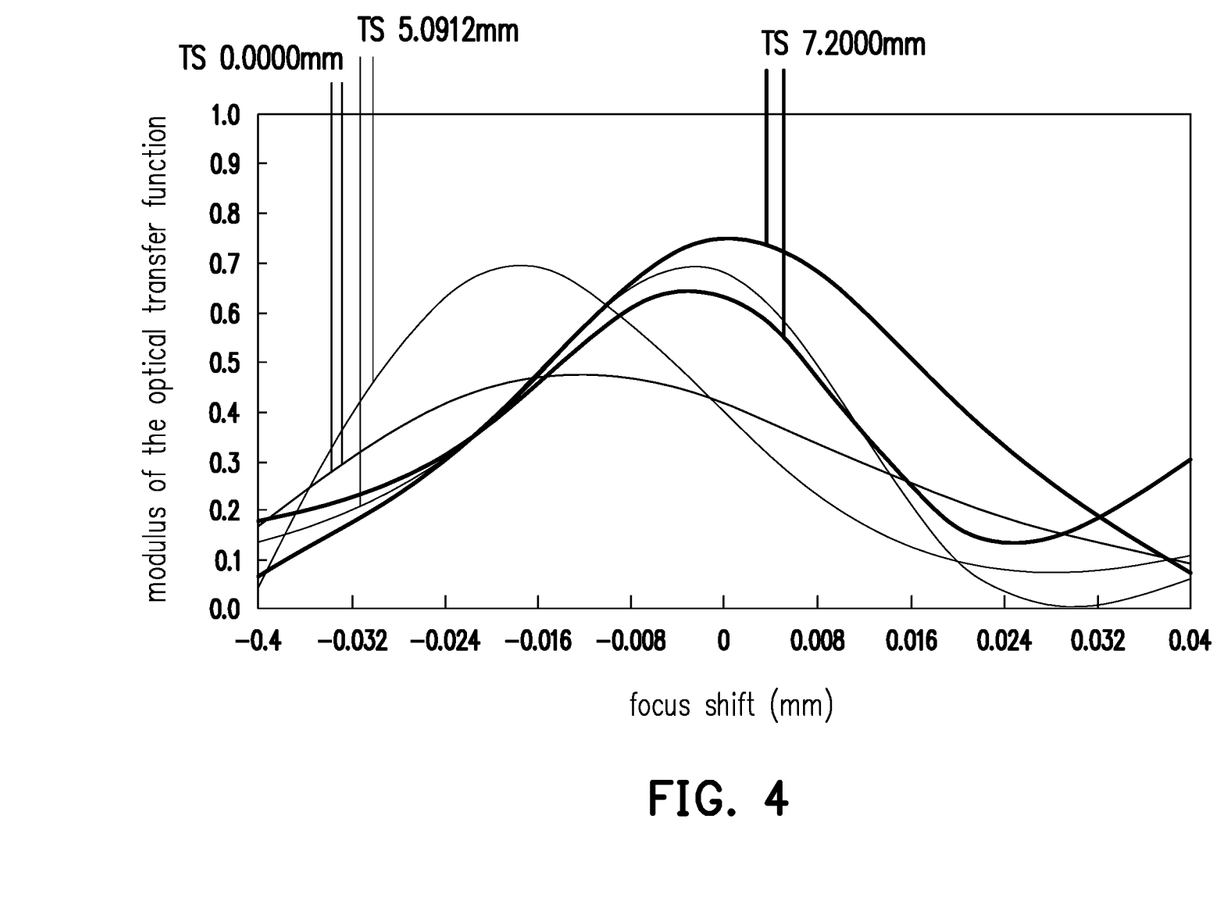
FIG. 4 is a modulation transfer function curve diagram of the fixed-focus projection lens in the embodiment of FIG. 1 at an ambient temperature of 25 degrees.
Figure 5:
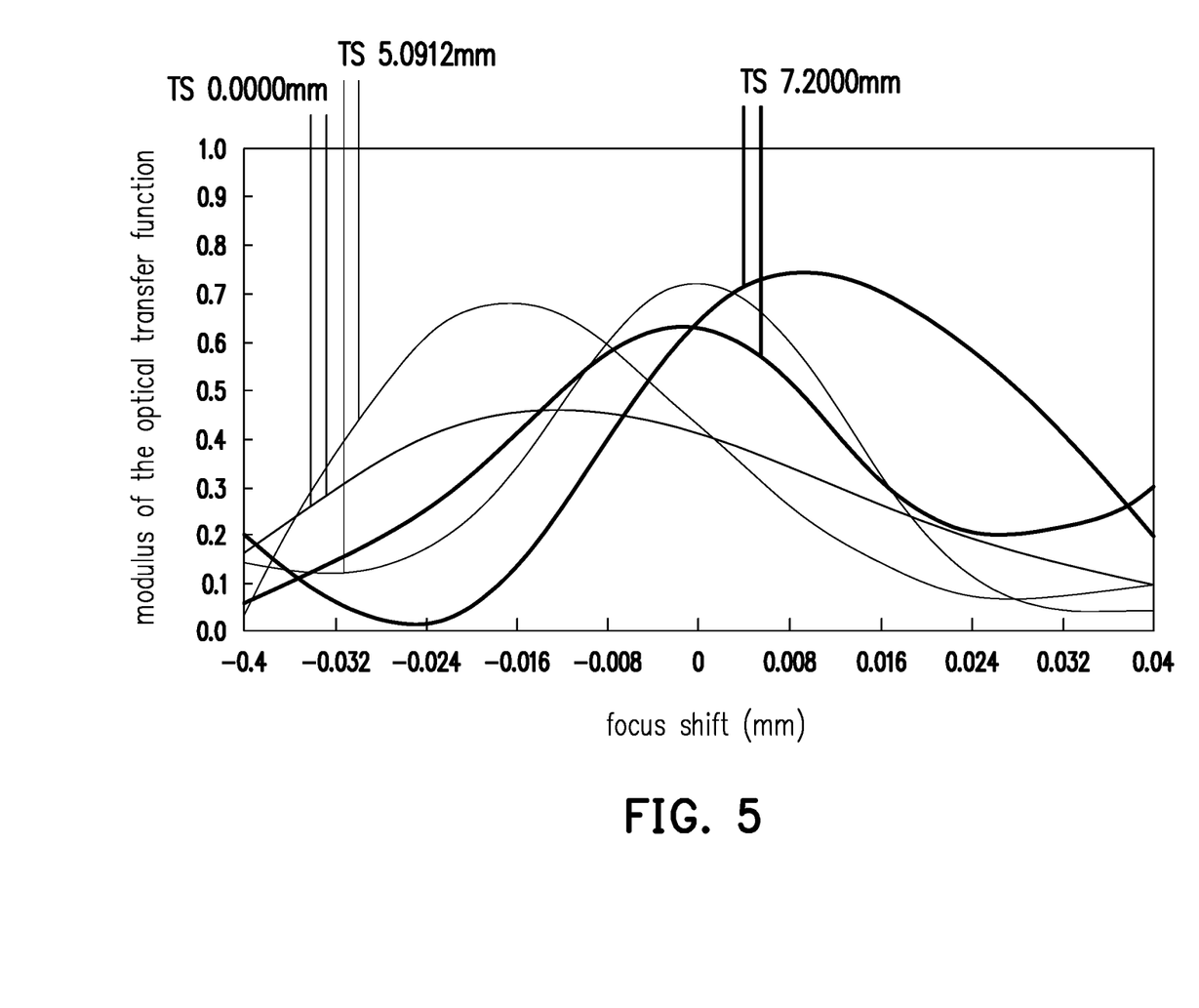
FIG. 5 is a modulation transfer function curve diagram of the fixed-focus projection lens in the embodiment of FIG. 1 at an ambient temperature of 40 degrees.

FIG. 2 is a transverse ray fan plot of the fixed-focus projection lens according to the embodiment of FIG. 1. FIG. 3 is a modulation transfer function (MTF) curve diagram of the fixed-focus projection lens according to the embodiment of FIG. 1. Referring to FIG. 2, for a light beam of a 0.525 µm wavelength, the fixed-focus projection lens 100 of the embodiment may result in lateral aberrations ranging from −20 µm to 20 µm as for various images of different heights. Referring to FIG. 3, the horizontal coordinate in FIG. 3 represents focus shifts, and the longitudinal coordinate represents modulus of the optical transfer function (OTF). Since patterns shown in FIG. 2 and FIG. 3 are within a standard range, the fixed-focus projection lens 100 of the embodiment is proved to be able to achieve images with good quality. Moreover, FIG. 4 is a modulation transfer function curve diagram of the fixed-focus projection lens in the embodiment of FIG. 1 at an ambient temperature of 25 degrees (room temperature). FIG. 5 is a modulation transfer function curve diagram of the fixed-focus projection lens in the embodiment of FIG. 1 at an ambient temperature of 40 degrees (high temperature). Referring to FIG. 4 and FIG. 5, since patterns shown in FIG. 4 and FIG. 5 are also within a standard range, the fixed-focus projection lens 100 of the embodiment is proved to be able to achieve images with good quality whatever the temperature is a high ambient temperature or a normal ambient temperature. Meanwhile, since there is little difference between the pattern shown in FIG. 4 and that shown in FIG. 5, the fixed-focus projection lens 100 of the embodiment is proved to be able to achieve images with comparable qualities either under a high ambient temperature or a normal ambient temperature. In other words, the fixed-focus projection lens 100 of the embodiment can provide images with consistent qualities under different ambient temperatures ranging significantly.

Figure 6:
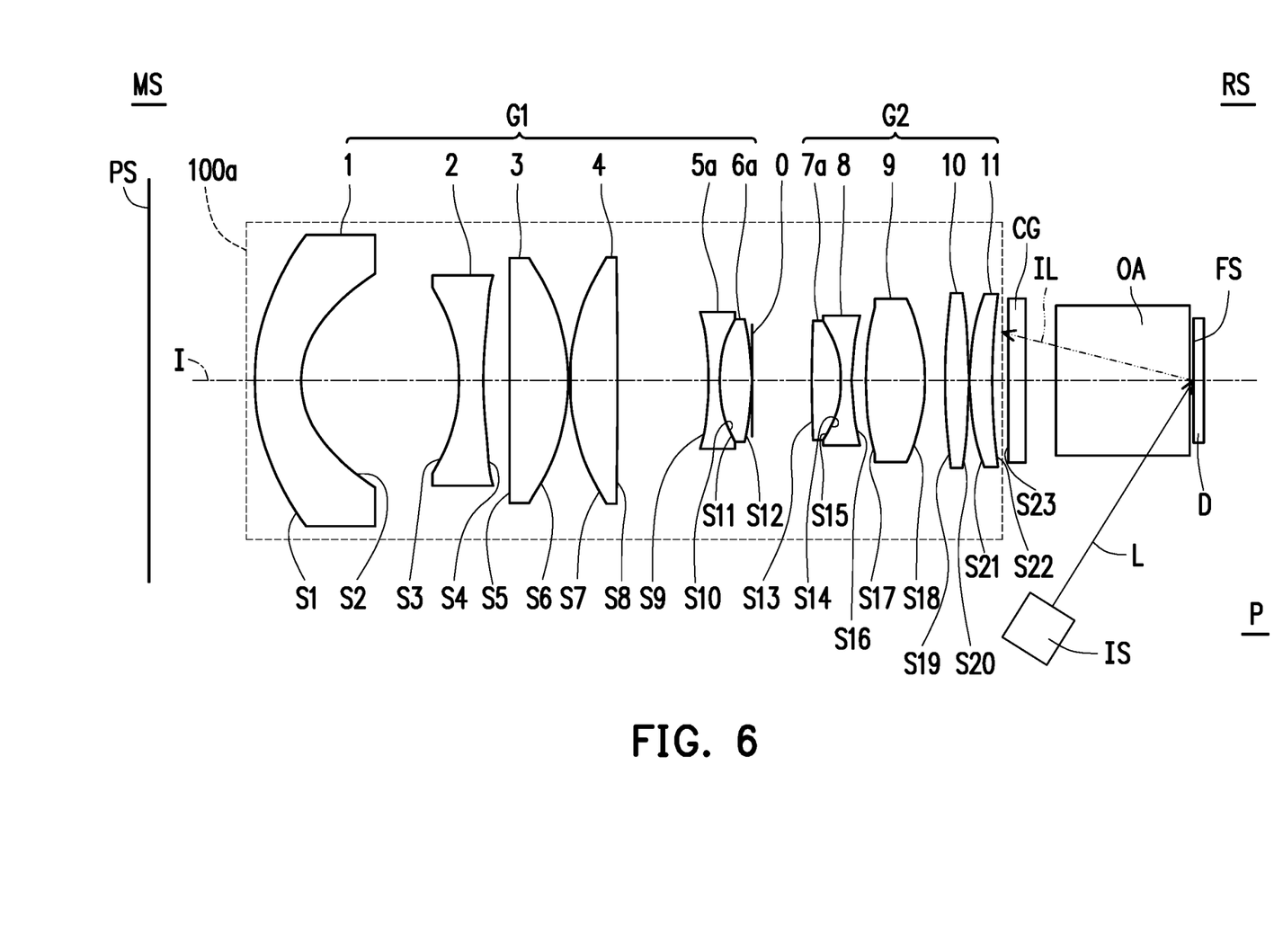
FIG. 6 is a schematic view of a fixed-focus projection lens according to another embodiment of the disclosure.

FIG. 6 is a schematic view of a fixed-focus projection lens according to another embodiment of the disclosure. Referring to FIG. 6, a fixed-focus projection lens 100a of FIG. 6 is similar to the fixed-focus projection lens 100 of FIG. 1, and similar or identical components are represented by similar or identical reference numerals. Functions, models, and configurations of those components are omitted from being described hereinafter. Main differences between the fixed-focus projection lens 100a and the fixed-focus projection lens 100 are listed as follows for example: in the first lens group G1, the first lens element 1 has a negative refractive power, the second lens element 2 has a negative refractive power, the third lens element 3 has a positive refractive power, the fourth lens element 4 has a positive refractive power, the fifth lens element 5 has a negative refractive power, and the sixth lens element 6 has a positive refractive power, and are listed as follows for example: in the second lens group G2, the seventh lens element 7 has a positive refractive power, the eighth lens element 8 has a negative refractive power, the ninth lens element 9 has a positive refractive power, the tenth lens element 10 has a positive refractive power, and the eleventh lens element 11 has a positive refractive power.

Next, in the embodiment, the fifth lens element 5a is a biconcave lens element, the sixth lens element 6a is a biconvex lens element, the seventh lens element 7a is a biconvex lens element, and other lens elements are similar in surface shaping to these described with respect to FIG. 1. Similar descriptions are omitted, and the disclosure is not limited to these surface shapes of the lens elements described above.

Additionally, in the embodiment, the first lens group G1 and the second lens group G2 may each include at last one cemented lens and the aberration may therefore be effectively reduced. As shown in FIG. 6, in the first lens group G1, the fifth lens element 5a and the sixth lens element 6a form a cemented lens. In the second lens group G2, the seventh lens element 7a and the eighth lens element 8 form a cemented lens. However, the cemented lenses described above may be aspects of various cemented lenses combination, and the disclosure is not limited thereto.

An embodiment of the fixed-focus projection lens 100a is provided below. It should be pointed out that the data provided below does not serve to limit the disclosure. With reference to the present invention, those ordinarily skilled in the art may make an amendment or modification as required based on the data and/or settings within the principles of the present invention, and such amendments or modifications may fall into the scope of the present invention. After referring to the disclosure, persons skilled in the art can make modification to the parameter or setting as appropriate based on the principle of the disclosure, and such modification still belongs to the scope to be protected by the disclosure. Additionally, the Fno/f-number of the fixed-focus projection lens 100a in the embodiment is 1.67, for example.

TABLE 3

| Component | Surface | Radius of curvature (mm) | Gap (mm) | Refractive index | Abbe number |
|---|---|---|---|---|---|
| First | S1 | 25.13 | 5.52 | 1.53 | 56 |
| lens element 1 | S2 | 10.44 | 18.97 | | |
| Second | S3 | −20.35 | 2.88 | 1.92 | 18.9 |
| lens element 2 | S4 | 74.74 | 3.06 | | |
| Third | S5 | 8844.09 | 7.00 | 1.84 | 25 |
| lens element 3 | S6 | −24.96 | 0.27 | | |
| Fourth | S7 | 26.96 | 5.64 | 1.84 | 24.8 |
| lens element 4 | S8 | −555.87 | 10.92 | | |
| Fifth | S9 | −33.29 | 1.30 | 1.75 | 29.1 |
| lens element 5 | S10 | 15.92 | 0.00 | | |
| Sixth | S11 | 15.92 | 3.74 | 1.68 | 54.6 |
| lens element 6 | S12 | −34.52 | 0.16 | | |
| Aperture diaphragm 0 | | | 7.11 | | |
| Seventh | S13 | 179.20 | 3.47 | 1.50 | 81.5 |
| lens element 7 | S14 | −13.58 | 0.00 | | |
| Eighth | S15 | −13.58 | 1.30 | 1.83 | 27.2 |
| lens element 8 | S16 | 31.91 | 1.67 | | |
| Ninth | S17 | 37.55 | 7.00 | 1.50 | 81.5 |
| lens element 9 | S18 | −23.70 | 2.49 | | |
| Tenth | S19 | 80.79 | 2.79 | 1.77 | 49.6 |
| lens element 10 | S20 | −67.84 | 0.10 | | |
| Eleventh | S21 | 30.49 | 2.70 | 1.85 | 23.8 |
| lens element 11 | S22 | 77.60 | | | |

Descriptions of these components listed in Table 3 may correspond to the descriptions listed in Table 1 and may be omitted for the sake of simplicity. Additionally, in the embodiment, the first lens element 1 is an aspheric lens. The second lens element 2 to the eleventh lens element 11 are spherical lens. As for the aspheric lens, equation (1) listed-above may be incorporated for reference. Parameters of surface S1 and surface S2 of the first lens element 1 are listed in Table 4 below.

TABLE 4

| Surface | S1 | S2 |
|---|---|---|
| K | 0.00E+00 | −7.11E−02 |
| $A_4$ | −1.47E−06 | 1.98E−05 |
| $A_6$ | −3.84E−08 | −1.25E−07 |
| $A_8$ | 8.50E−11 | 7.44E−10 |
| $A_{10}$ | −1.87E−13 | −4.85E−12 |
| $A_{12}$ | 2.16E−16 | 8.97E−15 |

Figure 7:
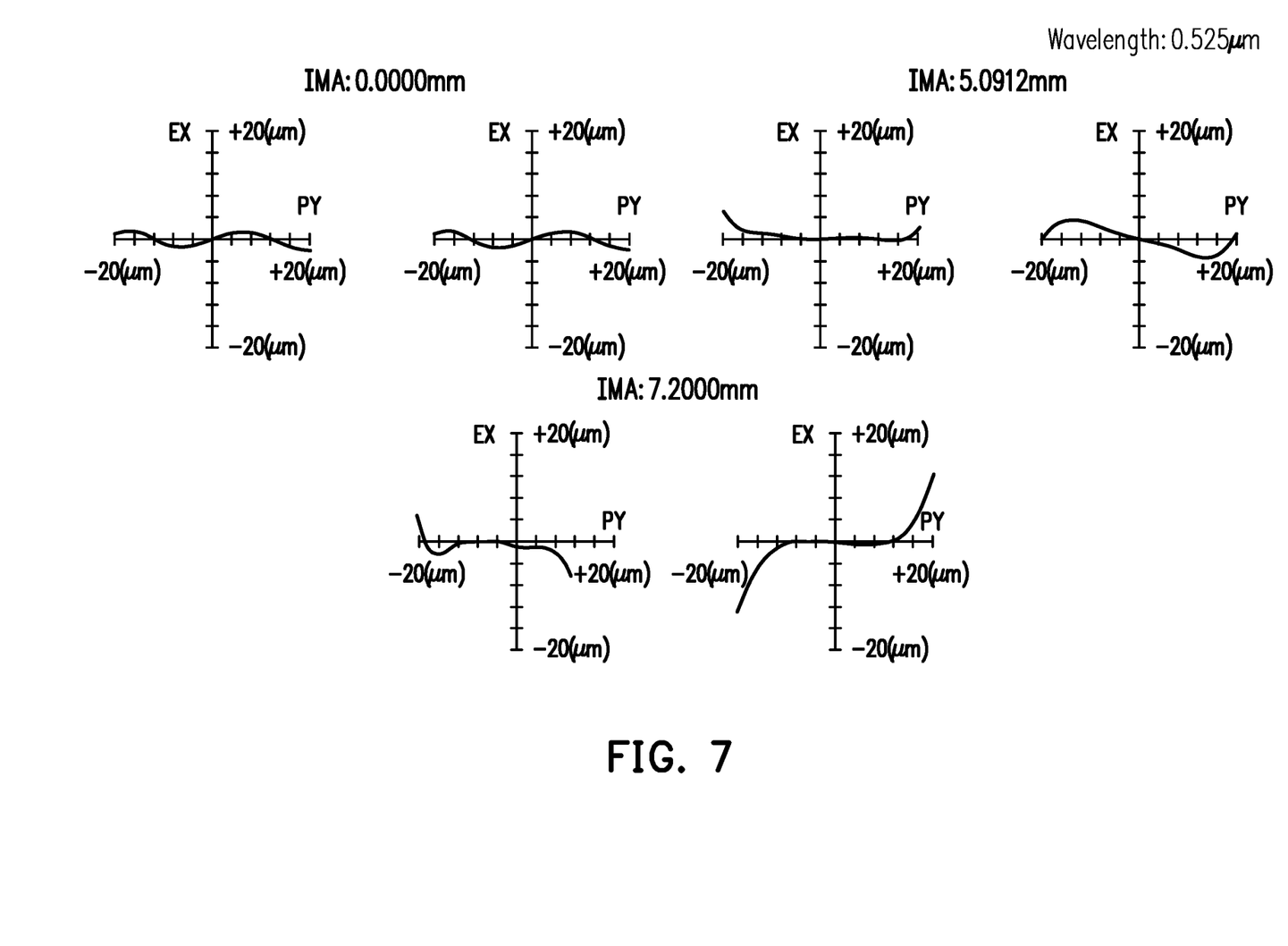
FIG. 7 is a transverse ray fan plot of the fixed-focus projection lens according to the embodiment of FIG. 6.
Figure 8:
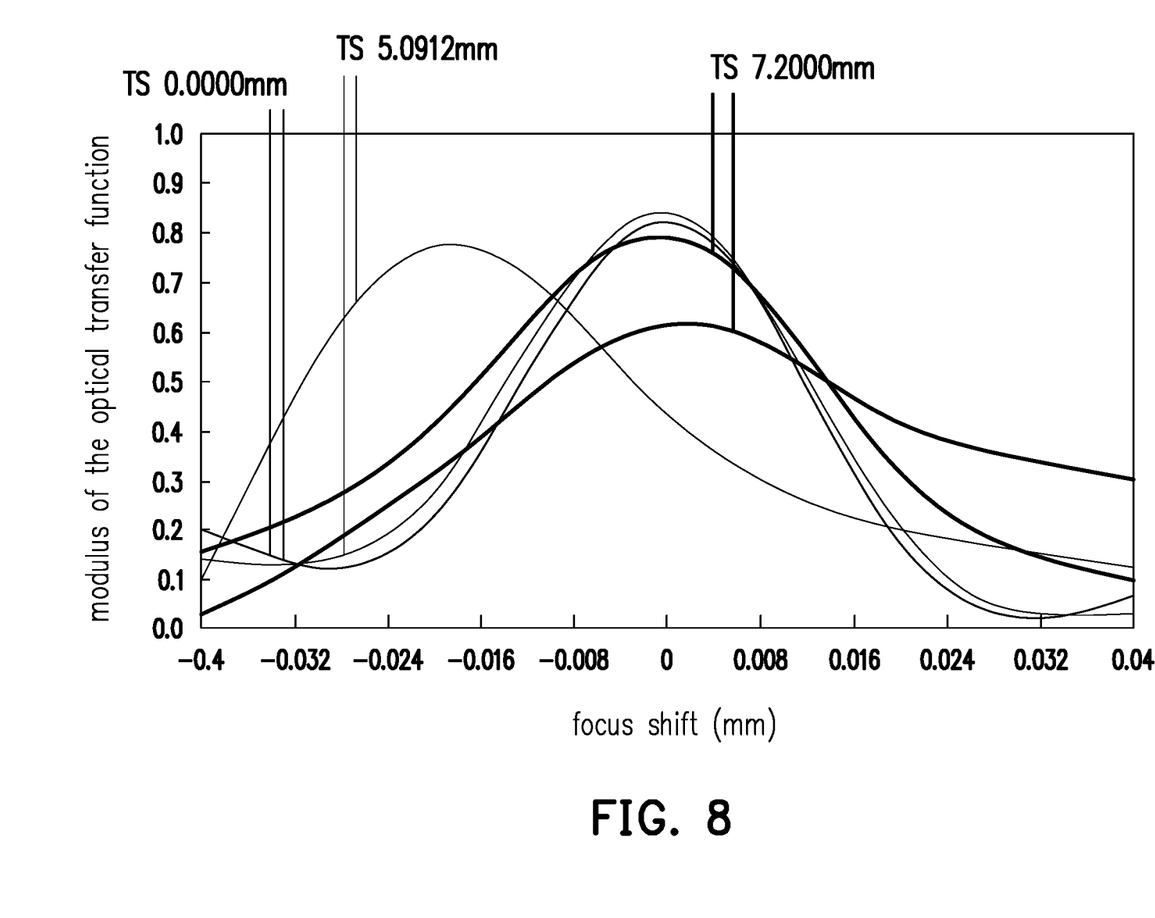
FIG. 8 is a modulation transfer function curve diagram of the fixed-focus projection lens according to the embodiment of FIG. 6.

FIG. 7 is a transverse ray fan plot of the fixed-focus projection lens according to the embodiment of FIG. 6. FIG. 8 is a modulation transfer function curve diagram of the fixed-focus projection lens according to the embodiment of FIG. 6. As shown in FIG. 7, for a light beam of a 0.525 μm wavelength, the fixed-focus projection lens 100a of the embodiment may result in lateral aberrations ranging from −20 μm to 20 μm as for various images of different heights. Referring to FIG. 7 and FIG. 8, since patterns shown in FIG. 7 and FIG. 8 are within a standard range, the fixed-focus projection lens 100a of the embodiment is proved to be able to achieve images with good quality. The fixed-focus projection lens 100a of the embodiment may also achieve images with consistent and good qualities either under a high ambient temperature or a normal ambient temperature.

As described above, as compared with conventional fixed-focus projection lens, the fixed-focus projection lenses 100, 100a of the embodiments of the disclosure, for example, may achieve images with good quality by configuring a single-sheet plastic lens with a negative refractive power, and are advantageous due to small volume. Moreover, either under a normal ambient temperature or a high ambient temperature, the fixed-focus projection lens described above may achieve images with good, consistent qualities, and the thermal drift is not significant. In other words, the fixed-focus projection lenses 100, 100a of the embodiments are durable at a wide range of temperatures, and the thermal drift thereof may be substantially prevented.

In order to easily describe the optical effect of the fixed-focus projection lenses 100, 100a of the embodiments of the disclosure as well as the definitions of the optical parameters of the disclosure, the fixed-focus projection lenses 100, 100a of the embodiments of the disclosure may be applied to an optical system, and the optical system is, for example, a projection device P. However, the disclosure is not intended to be limited by the applications of the fixed-focus projection lenses 100, 100a. The projection device P includes an illumination system IS, a light valve D, an optical lens set OA, a sheet glass CG and the above-mentioned fixed-focus projection lenses 100, 100a. The illumination system IS provides an illumination beam L. The light valve D is disposed on the transmission path of the illumination beam L, and is used to convert the illumination beam L into an image beam IL. The fixed-focus projection lenses 100, 100a are, for example, disposed on the transmission path of the image beam IL. Generally speaking, the image beam IL from a display surface FS of the light valve D passes through the optical lens set OA and the sheet glass CG sequentially, and enters the fixed-focus projection lens 100. The image beam from the light valve D at the incoming side RS enters the fixed-focus projection lens 100 and passes sequentially through the second lens group G2 (the eleventh lens element 11, the tenth lens element 10, the ninth lens element 9, the eighth lens element 8, the seventh lens element 7/7a), the aperture diaphragm 0 and the first lens group G1 (the sixth lens element 6/6a, the fifth lens element 5/5a, the fourth lens element 4, the third lens element 3, the second lens element 2, the first lens element 1). Then, the image beam IL forms an image on a projection screen PS at the outgoing side MS. The first lens group G1, the aperture diaphragm 0 and the second lens group G2 are adapted to move simultaneously with respect to the optical axis I for focusing. Specifically, a projection device P employing the fixed-focus projection lenses 100, 100a of the embodiments may achieve a clear image on the projection screen PS by ways of adjusting a distance along the optical axis I between a surface (facing toward the incoming side RS) of a lens closest to the light valve D (e.g., the eleventh lens element 1) and a surface (facing toward the outgoing side MS) of the sheet glass CG at the incoming side RS (for example, the distance between surface S22 and surface S23 along the optical axis I). In the fixed-focus projection lenses 100, 100a of the embodiments of the disclosure, the fixed-focus projection lenses 100, 100a may further satisfy the following condition: BFL/EFL>1.8, wherein EFL represents an effective focal length of the fixed-focus projection lenses 100, 100a. BFL is a back focal length of the fixed-focus projection lenses 100, 100a. Specifically, in the above embodiments, the eleventh lens element 11 is the first lens element with a non-zero refractive power when counted from the incoming side RS to the outgoing side MS. BFL is the distance along the optical axis I between surface S22 (facing toward the incoming side RS) of the eleventh lens element 11 and the display surface FS of the light valve D at the incoming side RS. The fixed-focus projection lens 100 shown in FIG. 1 and described in Table 1 has a BFL of 25.90 mm and an EFL of 14.34 mm. The fixed-focus projection lens 100a shown in FIG. 6 and described in Table 3 has a BFL of 25.51 mm and an EFL of 13.78 mm. Based on the values of the above parameters, the fixed-focus projection lenses 100, 100a satisfy the condition: BFL/EFL>1.8, such that an optical system (e.g., the projection device P) employing the fixed-focus projection lenses 100, 100a may have sufficient space for accommodating the lens element (i.e., the eleventh lens element 11) in the second lens group G2 closest to the light valve D.

In the fixed-focus projection lenses 100, 100a of the embodiments of the disclosure, the fixed-focus projection lenses 100, 100a may further satisfy the following condition: 6<TTL/EFL<12, wherein TTL is a distance along the optical axis I between surface S1 (facing toward the outgoing side MS) of the first lens element 1 and the display surface FS of the light valve D at the incoming side RS, and EFL represents the effective focal lengths of the fixed-focus projection lenses 100, 100a. The fixed-focus projection lens 100 shown in FIG. 1 and described in Table 1 has a distance (TTL) of 87.70 mm from surface S1 of the first lens element 1 to the display surface FS of the light valve D, and an EFL of 14.34 mm. The fixed-focus projection lens 100a shown in FIG. 6 and described in Table 3 has a distance (TTL) of 88.09 mm from surface S1 of the first lens element 1 to the display surface FS of the light valve D, and an EFL of 13.78 mm. Based on the values of the above parameters, the fixed-focus projection lenses 100, 100a satisfy the following condition: 6<TTL/EFL<12. If TTL/EFL is smaller than 6, the optical system (e.g., the projection device P, but no limited thereto) employing the fixed-focus projection lenses 100, 100a may be more sensitive to resolution. As a result, the yield rate of production may be reduced. If TTL/EFL is larger than 12, the optical system employing the fixed-focus projection lenses 100, 100a may be increased in volume. As a result, the market demand for light weight may not be satisfied.

In the fixed-focus projection lenses 100, 100a in the embodiments of the disclosure, the material of the first lens element 1 may further satisfy the following condition: $-1.75 \times 10^{-4} \leq dn/dt \leq -1.14 \times 10^{-4}$, wherein dn/dt is a temperature coefficient of refractive index of the material of the first lens element 1. Temperature coefficient of refractive index is related to the difference in refractive index caused per temperature, that is, for example, the value difference of refractive index caused when the temperature is increased by 1° C. If the material of the first lens element 1 satisfies the condition: $-1.75 \times 10^{-4} \leq dn/dt \leq -1.14 \times 10^{4}$, the first lens element 1, together with the second lens element 2 to the eleventh lens element 11 which are glass in material, may be used to prevent a thermal drift.

The aforementioned limitation relations are provided for example, and may be selectively combined and applied to various aspects of the embodiments of the invention in different manners. The disclosure should not be limited to the above examples.

In summary, the embodiments of the disclosure at least have one of the following advantages or effects. In the fixed-focus projection lenses of the embodiments of the disclosure, the first lens group has a negative refractive power, the second lens group has a positive refractive power, the material of the first lens element is selected as plastic, and the materials of the second to eleven lens elements are selected as glass. With such configuration, the fixed-focus projection lenses of the embodiments of the disclosure may achieve good optical quality with smaller volume, and the thermal drift may be substantially prevented as well.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A fixed-focus projection lens, comprising a first lens group, an aperture diaphragm and a second lens group arranged sequentially along an optical axis of the fixed-focus projection lens in a direction from an outgoing side to an incoming side, wherein the first lens group has a negative refractive power, and the first lens group comprises a first lens element, a second lens element, a third lens element, a fourth lens element, a fifth lens element and a sixth lens element arranged sequentially along the optical axis in the direction from the outgoing side to the incoming side, wherein the second lens group has a positive refractive power, and the second lens group comprises a seventh lens element, an eighth lens element, a ninth lens element, a tenth lens element and an eleventh lens element arranged sequentially along the optical axis in the direction from the outgoing side to the incoming side, and wherein a material of the first lens element is plastic, and materials of the second lens element to the eleventh lens element are glass, wherein the material of the first lens element satisfies the following condition:—$1.75\times10^{-4} \leq dn/dt \leq -1.14\times10^{-4}$, wherein dn/dt is a temperature coefficient of refractive index of the material of the first lens element.

2. The fixed-focus projection lens according to claim 1, wherein the fixed-focus projection lens further satisfies the following condition: BFL/EFL>1.8, wherein the eleventh lens element is a first lens element with a non-zero refractive power when counted from the incoming side to the outgoing side, BFL is a distance along the optical axis between a surface of the eleventh lens element facing toward the incoming side and a display surface of a light valve at the incoming side, and EFL represents an effective focal length of the fixed-focus projection lens.

3. The fixed-focus projection lens according to claim 1, wherein the fixed-focus projection lens further satisfies the following condition: 6<TTF/EFL<12, wherein TTL represents a distance along the optical axis between a surface of the first lens element facing toward the outgoing side and a display surface of a light valve at the incoming side, and EFL represents an effective focal length of the fixed-focus projection lens.

4. The fixed-focus projection lens according to claim 1, wherein the first lens group comprises at least one aspheric lens.

5. The fixed-focus projection lens according to claim 4, wherein the first lens element is the aspheric lens.

6. The fixed-focus projection lens according to claim 1, wherein the second lens element to the eleventh lens element are spherical lenses.

7. The fixed-focus projection lens according to claim 1, wherein the first lens group and the second lens group each comprises at least one cemented lens.

8. The fixed-focus projection lens according to claim 7, wherein in the first lens group, the fifth lens element and the sixth lens element form the cemented lens.

9. The fixed-focus projection lens according to claim 7, wherein in the second lens group, the eighth lens element and the ninth lens element form the cemented lens.

10. The fixed-focus projection lens according to claim 7, wherein in the second lens group, the seventh lens element and the eighth lens element form the cemented lens.

11. The fixed-focus projection lens according to claim 1, wherein the f-number of the fixed-focus projection lens is 1.67.

12. A fixed-focus projection lens, comprising a first lens group, an aperture diaphragm and a second lens group arranged sequentially along an optical axis of the fixed-focus projection lens in a direction from an outgoing side to an incoming side, wherein the first lens group has a negative refractive power, and the first lens group comprises a first lens element, a second lens element, a third lens element, a fourth lens element, a fifth lens element and a sixth lens element arranged sequentially along the optical axis in the direction from the outgoing side to the incoming side, wherein the second lens group has a positive refractive power, and the second lens group comprises a seventh lens element, an eighth lens element, a ninth lens element, a tenth lens element and an eleventh lens element arranged sequentially along the optical axis in the direction from the outgoing side to the incoming side, and wherein a material of the first lens element is plastic, and materials of the second lens element to the eleventh lens element are glass, wherein, in the first lens group, the first lens element has a negative refractive power, the second lens element has a negative refractive power, the third lens element has a positive refractive power, the fourth lens element has a positive refractive power, the fifth lens element has a positive refractive power and the sixth lens element has a negative refractive power, and wherein, in the second lens group, the seventh lens element has a positive refractive power, the eighth lens element has a negative refractive power, the ninth lens element has a positive refractive power, the tenth lens element has a positive refractive power, and the eleventh lens element has a positive refractive power.

13. A fixed-focus projection lens, comprising a first lens group, an aperture diaphragm and a second lens group arranged sequentially along an optical axis of the fixed-focus projection lens in a direction from an outgoing side to an incoming side, wherein the first lens group has a negative refractive power, and the first lens group comprises a first lens element, a second lens element, a third lens element, a fourth lens element, a fifth lens element and a sixth lens element arranged sequentially along the optical axis in the direction from the outgoing side to the incoming side, wherein the second lens group has a positive refractive power, and the second lens group comprises a seventh lens element, an eighth lens element, a ninth lens element, a tenth lens element and an eleventh lens element arranged sequentially along the optical axis in the direction from the outgoing side to the incoming side, and wherein a material of the first lens element is plastic, and materials of the second lens element to the eleventh lens element are glass, wherein, in the first lens group, the first lens element has a negative refractive power, the second lens element has a negative refractive power, the third lens element has a positive refractive power, the fourth lens element has a positive refractive power, the fifth lens element has a negative refractive power and the sixth lens element has a positive refractive power, and wherein, in the second lens group, the seventh lens element has a positive refractive power, the eighth lens element has a negative refractive power, the ninth lens element has a positive refractive power, the tenth lens element has a positive refractive power and the eleventh lens element has a positive refractive power.

14. A fixed-focus projection lens, comprising a first lens group, an aperture diaphragm and a second lens group arranged sequentially along an optical axis of the fixed-focus projection lens in a direction from an outgoing side to an incoming side, wherein the first lens group has a negative refractive power, and the first lens group comprises a first lens element, a second lens element, a third lens element, a fourth lens element, a fifth lens element and a sixth lens element arranged sequentially along the optical axis in the direction from the outgoing side to the incoming side, wherein the second lens group has a positive refractive power, and the second lens group comprises a seventh lens element, an eighth lens element, a ninth lens element, a tenth lens element and an eleventh lens element arranged sequentially along the optical axis in the direction from the outgoing side to the incoming side, and wherein a material of the first lens element is plastic, and materials of the second lens element to the eleventh lens element are glass, wherein the first lens group, the aperture diaphragm and the second lens group are adapted to move simultaneously with respect to the optical axis for focusing.

* * * * *